US011304405B2

(12) United States Patent
Daley et al.

(10) Patent No.: US 11,304,405 B2
(45) Date of Patent: Apr. 19, 2022

(54) SCENTED INSERT

(71) Applicant: My Clever Dog Pty Ltd., Largs Bay (AU)

(72) Inventors: Justin Anthony Daley, Largs Bay (AU); George Giles Campbell, Brighton (AU)

(73) Assignee: My Clever Dog Pty Ltd., Largs Bay (AU)

( * ) Notice: Subject to any disclaimer, the term of this patent is extended or adjusted under 35 U.S.C. 154(b) by 0 days.

(21) Appl. No.: 16/838,614

(22) Filed: Apr. 2, 2020

(65) Prior Publication Data

US 2020/0296932 A1 Sep. 24, 2020

Related U.S. Application Data

(63) Continuation of application No. 15/555,305, filed as application No. PCT/AU2016/000068 on Mar. 7, 2016, now abandoned.

(30) Foreign Application Priority Data

Mar. 6, 2015 (AU) ............................... 2015900805

(51) Int. Cl.
*B32B 3/00* (2006.01)
*A01K 15/02* (2006.01)
(52) U.S. Cl.
CPC ............ *A01K 15/026* (2013.01); *A01K 15/02* (2013.01)
(58) Field of Classification Search
CPC .............................. A01K 15/02; A01K 15/026
See application file for complete search history.

(56) References Cited

U.S. PATENT DOCUMENTS

| 3,655,129 | A | | 4/1972 | Seiner |
| 4,254,179 | A | | 3/1981 | Carson, III et al. |
| 4,898,633 | A | | 2/1990 | Doree et al. |
| 5,540,931 | A | | 7/1996 | Hewitt |
| 5,640,931 | A | * | 6/1997 | Markham ............ A01K 15/025 |
| | | | | 119/711 |
| 7,117,631 | B2 | * | 10/2006 | Peters ................... A01M 23/30 |
| | | | | 43/81 |

(Continued)

FOREIGN PATENT DOCUMENTS

WO 2015127502 A1 9/2015

OTHER PUBLICATIONS

Think you know dog toys? Think again! Introducing the Schnuzzle (retrieved on Mar. 24, 2016] <URL: http://www.petbloglady.com/2014/09/think-you-know-dog-toys-think-again-introducing-the-schnuzzle.html> Published Sep. 17, 2014. Entire document including embedded video.

(Continued)

*Primary Examiner* — Elizabeth E Mulvaney
(74) *Attorney, Agent, or Firm* — FisherBroyles, LLP; Craig W. Mueller

(57) ABSTRACT

A scented insert for use with an animal training aid, toy or device, the insert comprising a substrate having, a microencapsulated scented material thereon, and/or therein, and either one or both of: a substantially scent impermeable coating, wherein the coating substantially prevents release of a scent from the scented material; and at least one detent for engaging with a cognate protrusion or depression of a carrier for the insert.

9 Claims, 4 Drawing Sheets

(56) References Cited

U.S. PATENT DOCUMENTS

| 7,263,952 B1 | 9/2007 | Tsengas |
| 2004/0244719 A1 | 12/2004 | Jager |
| 2012/0085294 A1 | 4/2012 | Christianson |

OTHER PUBLICATIONS

International Search Report from parent PCT/AU2016/000068. dated Sep. 15, 2016. 4 pages.
Written Opinion from parent PCT/AU2016/000068. dated Sep. 15, 2016. 7 pages.
International Preliminary Report of Patentability from parent PCT/AU2016/000068. dated Sep. 12, 2017. 8 pages.
Non-Final Office Action from parent U.S. Appl. No. 15/555,305. dated Oct. 2, 2019. 6 pages.

* cited by examiner

SCENTED INSERT

PRIORITY DOCUMENTS

The present application is a U.S. Continuation of U.S. application Ser. No. 15/555,305 filed Sep. 1, 2017 which is a U.S. National Phase application under 35 USC § 371 of International Application No. PCT/AU2016/000068 filed 7 Mar. 2016 which claims priority from Australian Provisional Patent Application No. 2015900805 entitled "SCENTED INSERT" and filed on 6 Mar. 2015, the content of both applications are hereby incorporated by reference in their entireties.

TECHNICAL FIELD

The present disclosure relates to devices and systems for use in scent based activities with animals.

BACKGROUND

Many animals, such as dogs, have an acute sense of smell. For example, dogs have been used to perform various forms of scent-based detection work, including search and rescue of missing or injured persons, narcotic and drug detection, etc. Scents are also used as part of a dog training program to lure the dog toward an object or person, or to reward the dog for a particular behaviour. Scent based dog training devices and toys are known. For example, U.S. Pat. No. 6,531,145 discloses silica gel beads that conveniently release scent for use in training dogs to hunt using scent. Chew toys have been disclosed that contain a scent component in their manufacture to make them more attractive to dogs. For example, U.S. Pat. Nos. 4,513,014 and 3,871,334 disclose adding flavour additives to a synthetic moulded chew toy, either before or after the chew toy is moulded.

Dog appeasing pheromones, including synthetic compositions that replicate certain calming pheromones emitted by dogs, have also been used to deal with certain behaviours in dogs and other animal species. For example, pheromones can be used in animal bedding to calm an animal during sleep time.

Furthermore, many wild animals associate human scent with danger or avoidance and, as a result, it is often desirable for people attempting to interact with wildlife to mask their human scent with a stronger animal-neutral or animal-attractive scent.

A problem with many known scent based training aids, toys and devices is the scent is not renewable and, as a consequence, the scent based aspect of the aid, toy or device has a limited life. There is a need for a replaceable scent for such training aids, toys or devices. Alternatively, or in addition, there is a need for a scent for a training aid, toy or device in which the user can control when the scent is released.

SUMMARY

The present disclosure arises from research into scented training aids, toys and devices for animals in which the scent is replaceable.

According to a first aspect, there is provided a scented insert for use with an animal training aid, toy or device, the insert comprising a substrate having a microencapsulated scented material thereon and/or therein, a substantially scent impermeable coating on the substrate, and at least one detent that is operable to orient the insert in a carrier for the scented insert, and wherein the coating substantially prevents release of a scent from the scented material.

In certain embodiments of the first aspect, in use, the insert can be changed from an unactivated state in which the coating substantially prevents release of the scent from the scented material to an activated state in which the coating is not intact and the scent is released from the scented material. For example, the coating may be abraded or pierced to activate the insert and release a scent from the microencapsulated scented material.

Thus, according to a second aspect there is provided a scented insert for use with an animal training aid, toy or device, the insert comprising a substrate having a microencapsulated scented material thereon and/or therein, a substantially scent impermeable coating on the substrate, and at least one detent that is operable to orient the insert in a carrier for the scented insert, and wherein the scented material releases substantially no scent that is desirable to an animal when the insert is in an unactivated state and releases a scent that is desirable to the animal when the insert is in an activated state.

In certain embodiments of the second aspect, in use, the scented insert is converted from the unactivated state to the activated state by abrading the coating to release a scent from the microencapsulated scented material.

In certain embodiments of the first and second aspects, the microencapsulated scented material is coated on at least part of a surface of the substrate.

In certain embodiments of the first and second aspects, the scented material comprises at least one of a pheromone, meat, egg, dairy, vegetable or fruit scent.

In certain embodiments of the first and second aspects, the substantially scent impermeable coating comprises a polymeric material.

In certain embodiments of the first and second aspects, the substrate comprises a porous material.

In certain embodiments of the first and second aspects, the at least one detent inhibits a movement of the insert in the carrier. The movement that is inhibited may be rotation of the insert in the carrier.

In certain embodiments of the first and second aspects, the insert has a thin form factor. For example, the insert may be in the form of a disc.

In certain embodiments of the first and second aspects, the at least one detent extends from a periphery of the insert. The at least one detent may substantially inhibit rotational movement of the disc about an axis of the disc when positioned in the carrier.

In certain embodiments of the first and second aspects in which the insert is in the form of a disc, the at least one detent extends radially from the periphery of the disc.

According to a third aspect, there is provided a scented insert for use with an animal training aid, toy or device, the insert comprising a substrate having a microencapsulated scented material thereon or therein, and at least one detent for engaging with a cognate protrusion or depression of a carrier for the insert.

In certain embodiments of the third aspect, the at least one detent is operable to orient the insert in the carrier. In certain embodiments of the third aspect, the at least one detent extends from a periphery of the insert. In certain embodiments of the third aspect, the at least one detent inhibits a movement of the insert in the carrier. For example, the at least one detent may inhibit a rotational movement of the insert in the carrier.

In certain embodiments of the third aspect, the insert has a thin form factor. For example, the insert may be in the form of a disc. In these embodiments, the at least one detent may extend radially from the periphery of the disc. In these embodiments, the at least one detent may inhibit rotational movement of the disc about a central axis of the disc when it is positioned in the carrier.

In certain embodiments of the third aspect, the scented insert further comprises a substantially scent impermeable coating on the substrate.

In certain embodiments of the third aspect, the coating comprises a polymeric material.

In certain embodiments of the third aspect, the microencapsulated scent is coated on at least part of a surface of the substrate.

In certain embodiments of the third aspect, in use, the scented insert is converted from an unactivated state to an activated state by abrading the coating to release a scent from the microencapsulated scented material.

In certain embodiments of the third aspect, the scent comprises at least one of a pheromone, meat, egg, dairy, vegetable or fruit scent.

In certain embodiments of the third aspect, the substrate comprises a porous material.

According to a fourth aspect, there is presided a scented insert for use with an animal training aid, toy or device, the insert comprising a substrate having a microencapsulated scented material thereon and/or therein, a substantially scent impermeable coating, and at least one detent that is operable to orient the insert in a carrier for the seemed insert, and wherein the coating substantially prevents release of a scent from the scented material.

In certain embodiments of the fourth aspect, in use, the insert can be changed from an unactivated state in which the coating substantially prevents release of the scent from the scented material to an activated state in which the coating is not intact and the scent is released from the scented material. For example, the coating may be abraded or pierced to activate the insert and release a scent from the microencapsulated scented material.

Thus, according to a fifth aspect there is provided a scented insert for use with an animal training aid, toy or device, the insert comprising a substrate having a microencapsulated scented material thereon and/or therein, a substantially scent impermeable coating, and at least one detent that is operable to orient the insert in a carrier for the scented insert, wherein the scented material releases substantially no scent that is desirable to an animal when the insert is in an unactivated state and releases a scent that is desirable to the animal when the insert is in an activated state.

In certain embodiments of the fifth aspect, in use, the seemed insert is converted from the unactivated state to the activated state by abrading the coating to release a scent from the microencapsulated scented material.

In certain embodiments of the fourth and fifth aspects, the microencapsulated scented material is coated on at least part of a surface of the substrate.

In certain embodiments of the fourth and fifth aspects, the scented material comprises at least one of a pheromone, meat, egg, dairy, vegetable or fruit scent.

In certain embodiments of the fourth and fifth aspects, the substantially scent impermeable coating comprises a polymeric material.

In certain embodiments of the fourth and fifth aspects, the scented material is contained within microcapsules and each microcapsule comprises a shell, and wherein the substantially scent impermeable coating is the shell.

In certain embodiments of the fourth and fifth aspects, the substrate comprises a porous material.

In certain embodiments of the fourth and fifth aspects, the at least one detent inhibits a movement of the insert in the carrier. The movement that is inhibited may be rotation of the insert in the carrier.

In certain embodiments of the fourth and fifth aspects, the insert has a thin form factor. For example, the insert may be in the form of a disc.

In certain embodiments of the fourth and fifth aspects, the at least one detent extends from a periphery of the insert. The at least one detent may substantially inhibit rotational movement of the disc about an axis of the disc when positioned in the carrier.

In certain embodiments of the fourth and fifth aspects in which the insert is in the form of a disc, the at least one detent extends radially from the periphery of the disc.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
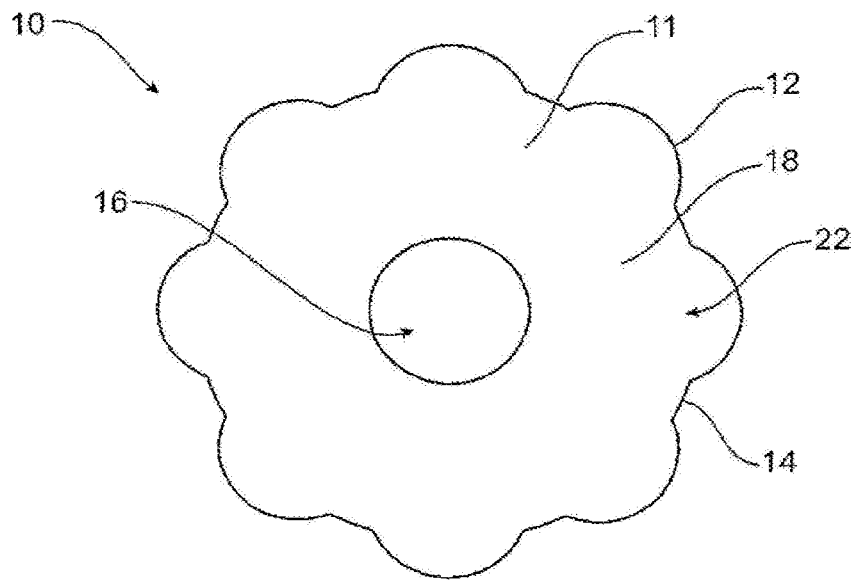
FIG. 1 is a plan view of the scented insert in accordance with an embodiment of the disclosure.
Figure 2:
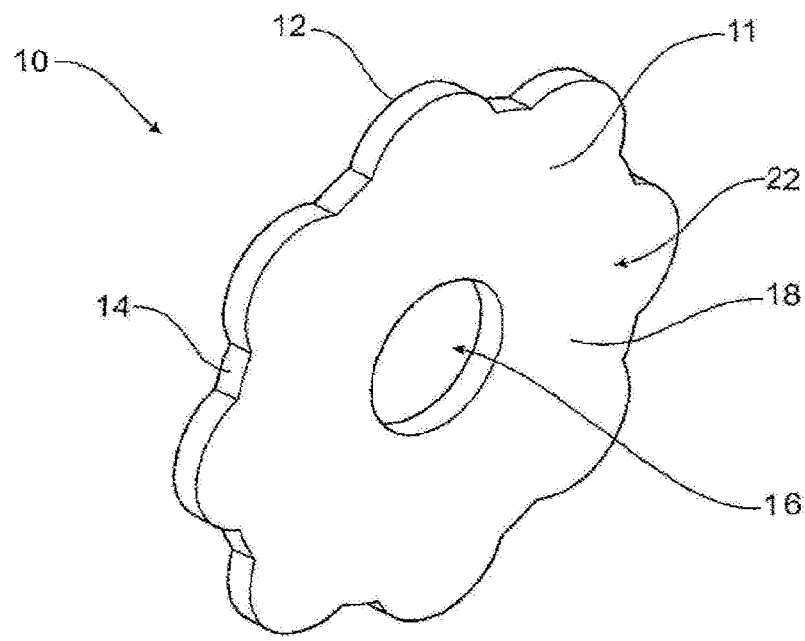
FIG. 2 is a perspective view of the scented insert in accordance with an embodiment of the disclosure.
Figure 3:
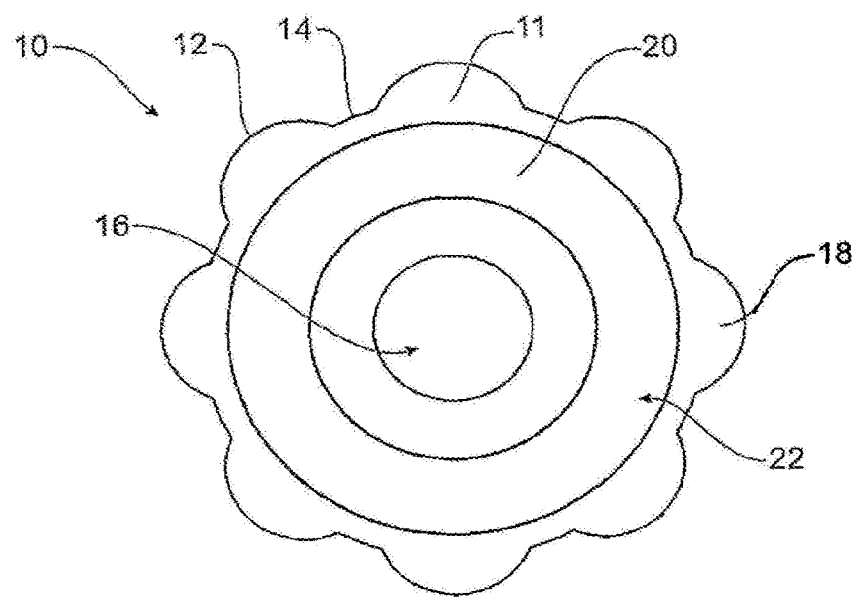
FIG. 3 is a plan view of the scented insert showing the scented material in accordance with an embodiment of the disclosure.
Figure 4:
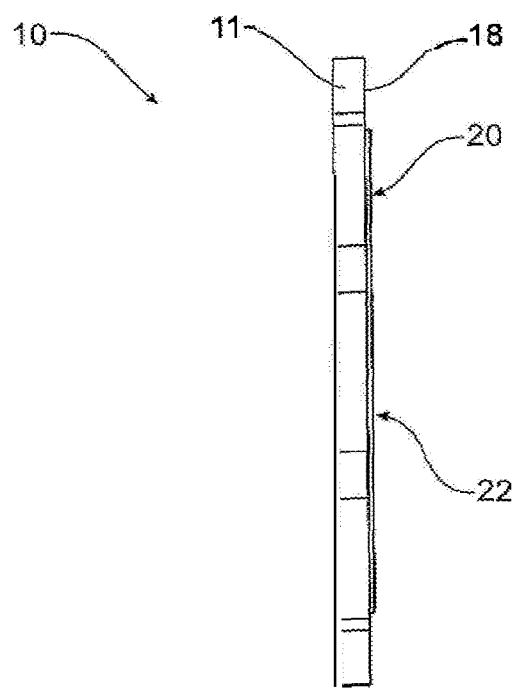
FIG. 4 is an end view of the view of the scented insert showing the scented material in accordance with an embodiment of the disclosure.

FIGS. 1 to 7 show an embodiment of a scented insert 10 for an animal training aid, toy or device.

The scented insert 10 for an animal training aid, toy or device is suitable for use in scent based animal activities. For example, the scented insert 10 can be used in an animal training aid, toy or device produced by the present applicant and described in Australian provisional patent application No. 2014900641.

The scented insert 10 has a body 11 comprising a substrate 18, a microencapsulated scented material 20, a substantially scent impermeable coating 22 on the substrate and at least one detent 12 that is operable to orient the insert in a carrier for the scented insert. In certain embodiments, the coating 22 is an additional layer that coats the substrate 18 and microencapsulated scented material 20. In other embodiments, the coating 22 is a shell surrounding individual microcapsules that contain the scented material. In an unactivated state, the coating 22 substantially prevents release of the scented material. The scented insert 10 is activated by abrading the coating 22 to expose the microencapsulated scented material 20 and rupture the microcapsules to release a scent from the scented material 20 within. Other methods and means for changing the scented insert 10 from an unactivated stale in which the coating 22 substantially prevents release of the scent from the scented material to an activated state in which the coating is not intact and the scent is released from the scented material could also be used. Suitable methods and means include, but are not limited to, puncturing the coating 22, dissolving the coating 22 or part thereof, physically removing the coating 22 or part thereof, forcing open perforations, slits or star-shaped openings etc.

As used herein, the term "substantially prevents release of the scented material", or similar terms, means that the scented material 20 should not appreciably contaminate the hands of a user inserting a new scented insert into an animal training aid, toy or device when the coaling 22 is still intact. Alternatively, or in addition, the term "substantially prevents release of the scented material", or similar terms, means the scent is not substantially detectable to a human when the coating 22 is intact. The scent may not be detectable or it may be faintly detectable to a dog when the coaling 22 is intact. Accordingly, the concentration of a scent in the air surrounding the scented insert 10 should be below or around the odour threshold value (OTV) for a human when the coating 22 is still intact. For example, the OTV of 2-acetylthiazole—found in roasted turkey, raw chicken, boiled or roasted beef and pork liver—is 4 parts per billion (ppb), so the concentration of 2-acetylthiazole should be below 4 ppb when the coating 22 is intact. The OTV of 2,2,3-trimethylcyclopent-3-en-1-yl acetaldehyde—found in chicken fat, cooked beef and mutton, cured pork and pork and beef fat—is between 8.6 and 41 ppb, so the concentration of 2,2,3-trimethylcyclopent-3-en-1-yl acetaldehyde should be below 8.6 ppb when the coating 22 is intact. Further examples of scented materials and their respective OTVs may be readily identified by the person skilled in the art through reference to standard texts such as Fenaroli's Handbook of Flavor ingredients, Sixth Edition, by George A. Burdock, published by CRC Press, 2010.

In the illustrated embodiment, the scented insert 10 is a disc that is generally circular in plan view. The scented insert 10 could be any other suitable shape such as a polyhedron, pyramid, sphere, ellipsoid, cone or cylinder. However, for storage and transport reasons, the scented insert 22 preferably has a thin form factor, such as a disc. The disc may be any suitable shape in plan view, such as square, rectangular, triangular, etc. In these cases, the scented insert 10 may not require any specifically formed detents extending outwardly or inwardly from the periphery of the disc because any corners of the disc may perform the same function as the detents, as explained in more detail later.

The scented insert 10 has a plurality of outward detents 12 and inward detents 14 extending radially from a periphery of the disc. Although a series of detents are illustrated, it is contemplated that the scented insert 10 can have only a single detent or more than one detent. In embodiments, at least one detent extends from an external portion of the scented insert 10. In embodiments, the at least one detent comprises a recess or aperture within the scented insert 10.

Figure 5:
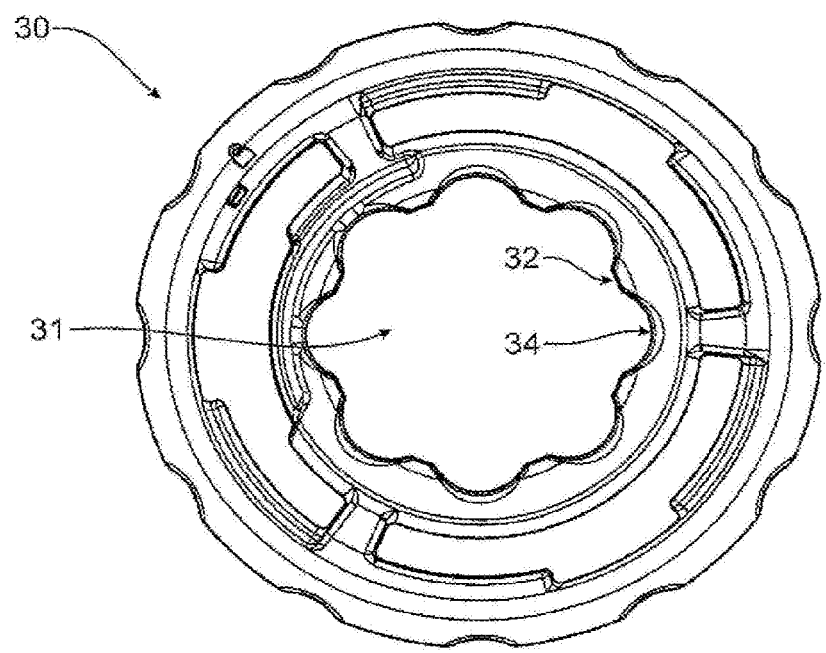
FIG. 5 is a plan view of the carrier for the scented insert in accordance with an embodiment of the disclosure.
Figure 6:
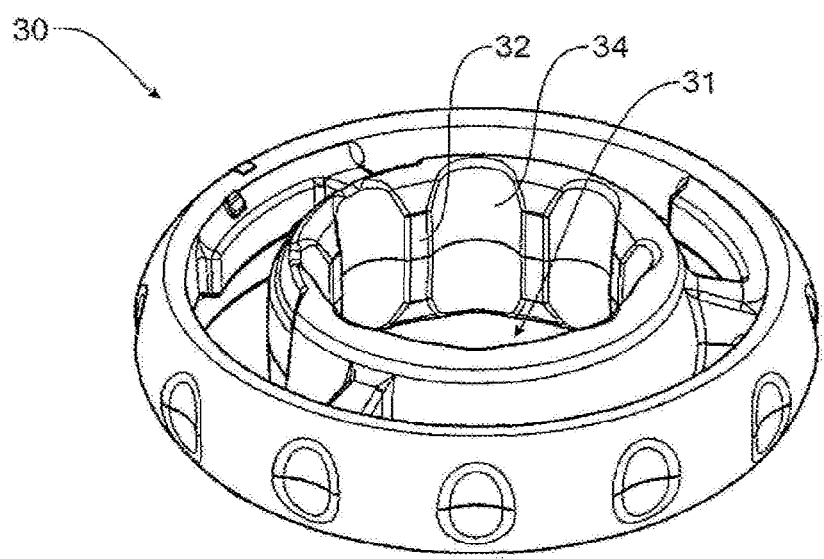
FIG. 6 is a perspective view of the carrier for the scented insert in accordance with an embodiment of the disclosure.
Figure 7:
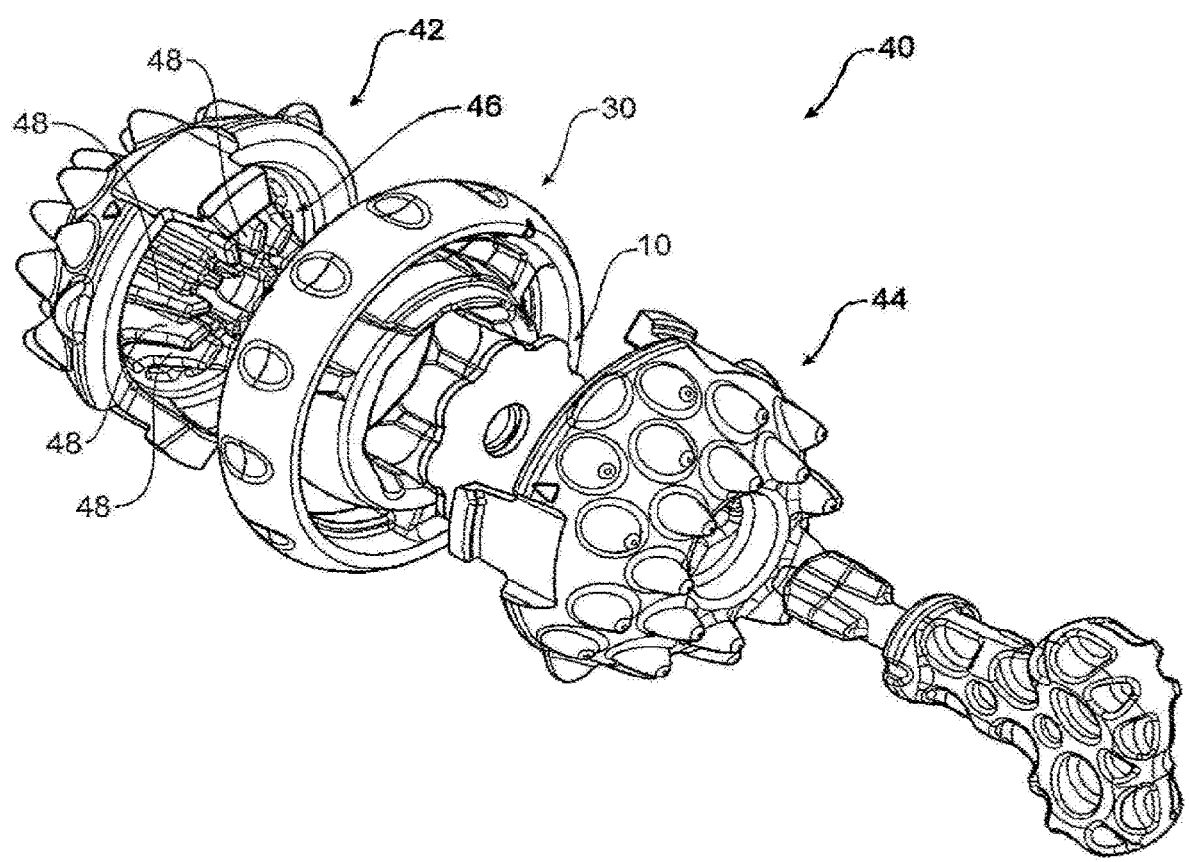
FIG. 7 is an exploded view of an animal training aid, toy or device, carrier and scented insert in accordance with an embodiment of the disclosure.

The detents 12, 14 are operable to orient the seemed insert 10 in an interior cavity 31 of a carrier 30, shown in FIGS. 5, 6 and 7. The detents locate in cognate depressions 34 and cognate protrusions 32 of the carrier 30. The outward detents 12 locate in depressions 34 and the protrusions 32 locate in the inward detents 14. The interlocking detents 12, 14 of the scented insert 10 and cognate portions 34, 32 of the carrier 30 inhibit a movement of the scented insert 10 in the carrier, such as a rotational movement of the disc about an axis of the disc when positioned in the carrier. In this way, the scented insert 10 is unable to rotate relative to the carrier 30. In alternative embodiments, an at least one detent of the insert 10 and an at least one cognate portion of the carrier 30 inhibit other forms of movement, such as translational movement.

In the illustrated embodiment, the scented insert 10 is 44 millimetres (mm) in diameter between outward detents 12 and 38 mm in diameter between inward detents 14. However, the scented insert 10 may be between 5 mm and 80 mm in diameter, greater than 80 mm in diameter or any other suitable diameter. In the illustrated embodiment, the scented insert 10 has an aperture 16 that is 12 mm in diameter. In alternative embodiments, the aperture 16 is between 1 mm and 70 mm in diameter. In other embodiments, the aperture 16 is not present. In the illustrated embodiment, the scented insert 10 has a thickness of 2 mm. In alternative embodiments, the thickness of the scented insert 10 is between 0.1 mm and 80 mm or greater than 80 mm. The above size ranges apply to the illustrated embodiment of the scented insert 10 and are not intended to limit the size of the scented insert 10 in embodiments in which the scented insert 10 is of a different shape.

The body of the scented insert 10 may be any substantially porous or non-porous substrate. That is, the body may comprise either one or both of at least one porous substrate and at least one non-porous substrate. In embodiments, the substrate comprises at least one porous material such as paper, cardboard, card, wood, sponge, stone, ceramics, zeolites, porous plastics, foams, fibrous organic or inorganic material such as fibre matting or any other suitable porous material. Recycled, biodegradable card stock is a particularly suitable porous material for this purpose. In other embodiments, the substrate comprises at least one substantially non-porous material such as plastic, polyethylene, polyester, styrene, static cling, coated fibreboard, polyboards, foils, vinyls or synthetic papers. In embodiments, the substrate has multiple layers or is laminated. Accordingly, the substrate 14 may comprise a plastic layer sandwiched between two paper layers, which may increase strength and durability.

The microencapsulated scented material 20 is any substance that provides a scent that is attractive to an animal or neutralizes another scent that is not attractive to an animal (e.g. the scent of a human). Accordingly, the material 20 may comprise a gas, a liquid, a gel, a solid or a porous solid impregnated with a gas, liquid or gel. Scented materials 20 are commonly oils although other forms can also be used. The material 20 comprises at least an active constituent or scent. The scent may be a natural or synthetic food flavour, food fragrance, pheromone, glandular secretion, glandular material, urine, urine-derived scent, etc. In embodiments, the scent may be any one or more of a pheromone, meat, egg, dairy, vegetable or fruit scent. For dogs, chicken, beef, bacon, ham or salmon scents can be used. These scents are available commercially from suppliers such as Taste Master Pty Ltd (South Australia. Australia), Allsense (New South Wales, Australia) or Doc's Products (Ohio, USA). In embodiments, in addition to the scent, the scented material 20 further comprises any one or more of stabilisers, diluents, excipients and release-rate retardants or accelerators.

Stabilisers are often used as suspending agents for fragrances. Non-limiting examples of stabilisers that can be used include, but are not limited to, polyvinyl alcohol (PVA), polyvinyl pyrrolidone (PVP), polyacrylic acid (PAA), starch, gelatin, hydroxypropylmethyl cellulose phthalate (HPMCP) and the like.

Diluents are often used to dilute more potent fragrances or to control the vapour pressure and evaporation characteristics of the fragrance. Non-limiting examples of diluents that can be used include, but are not limited, to aliphatic alcohols, such as ethyl alcohol, non-ethanoic diluents, diethyl phthalate, dipropylene glycol, benzyl benzoate, acetyl tributyl citrate, Hercolyn D, isopropyl myristate and the like.

Excipients are generally inactive substances that serve as the vehicle or medium for other active substances, such us fragrances. Non-limiting examples of excipients that can be used include, but are not limited to, surfactants, emulsifiers, soap acids, solvents, colourants, preservatives, antioxidants, antifoaming agents, antimicrobial agents, anti-redeposition agents, enzymes, vegetal or mineral oils, fats, fluorescent materials, fungicides, hydrotropes, moisturisers, perfume carriers, proteins, silicones, solubilisers, sugar derivatives, vitamins, plant extracts and waxes. Excipients generally used in such products may be found in the "International Cosmetic Ingredient Dictionary," Cosmetic, Toiletry & Fragrance Association, Inc. Washington, 1995.

Non-limiting examples of release-rate accelerators that can be used include, but are not limited to, dihydroxypropyl quaternary ammonium salts, highly refined and deodorised kerosene, propylene glycol, ethylene glycol and comparable low molecular weight monobasic, dibasic and polyhydric alcohols, which may be more volatile than the scent.

Non-limiting examples of release-rate retardants that can be used include, but are not limited to, $C_8$-$C_{20}$ fatty alcohols and ethoxylated fatty alcohols such behenyl alcohol, caprylic alcohol, cetyl alcohol, cetaryl alcohol, decyl alcohol, lauryl alcohol iso-cetyl alcohol, myristyl alcohol, oleyl alcohol, stearyl alcohol, tallow alcohol, steareth-2, ceteth-1, cetearth-3, and laureth-2; $C_8$-$C_{20}$ fatty acids, such as stearic acid, capric acid, behenic acid, caprylic acid, lauric acid, yristic acid, tallow acid, oleic acid, palmitic acid and isotearic acid; hydrocarbons, such as mineral oil, 1-decene dimer, a poly-decene, paraffir oetrolatum, or isoparaffin; waxes, such as mink wax, montan wax, carnauba wax, and candelilla wax; synthetic waxes, like silicone waxes, polyethylene, and polypropylene; fats and oils such as lanolin oil, linseed oil, coco-nut oil, olive oil, menhaden oil, castor oil, soybean oil, tall oil, rapeseed oil, palm oil, and neatsfoot oil; glyceryl esters of fatty acids, lanolin derivatives, such as hydrogenated lanolin, oleyl lanolate, lanolinamide DEA, and similar lanolin derivatives; essential oils, such as eucalyptus oil, peppermint oil, rose oil, clove oil, lemon oil, pine oil, and orange oil; diethyl phthalate, benzyl benzoate, propylene glycol, glyceryl triacetate (triacetin) and the like.

In embodiments, the scented material 20 is microencapsulated. In embodiments, the microcapsules are between 0.1 micrometre (μm) and 5 mm in diameter. The microcapsules comprise a shell (i.e. wall) surrounding the scented material 20. In embodiments, the shell material is selected to optimise properties such as cohesiveness, permeability, moisture sorption, solubility, stability, clarity and rupture method. In embodiments, the shell comprises at least one of: a water-soluble resin such as gelatine, agar, alginates, gum arabic, starch, polyoxymethylene urea, polyvinylpyrrolidone, carboxymethylcellulose, hydroxyethylcellulose, methyl cellulose, arabinogalactan, polyvinyl alcohol, polyacrylic acid; a water-insoluble resin such as ethyl cellulose, polyethylene, polymethacrylate, polyamide (Nylon), poly (ethylene-vinyl acetate), cellulose nitrate, silicones, poly(lactide-coglycolide), aminoplast polymers comprising the reaction products of urea and an aldehyde; a wax or lipid such as paraffin, carnauba, spermaceti, beeswax, stearic acid, stearyl alcohol, glyceryl stearates; or an enteric resin such as shellac, cellulose acetate phthalate and zein or any other suitable natural or synthetic polymers.

The shell thickness is designed to minimise rupture during any one or more of production of the scented inserted, application of the microcapsules to the substrate, packaging, storage and manual handling. The shell thickness is designed to enhance rupture by an abrasive, compressive or piercing force in accordance with the intended use of the scented insert 10. In alternative embodiments, the shell thickness is optimised according to the rupture method such as mechanical shear, pH, temperature (i.e. melting or bursting due to internal pressure) or dissolution when a solvent/chemical is added. In certain embodiments, the microcapsules have an average shell thickness ranging from about 0.1 to 100 μm, for example, from about 0.4 to 30 μm.

The microcapsules are prepared according to microencapsulation methods known in the art. Physical methods include spray drying, spray chilling, rotary disk atomisation, fluid bed coating, stationary nozzle co-extrusion, multi-orifice centrifugal process, submerged nozzle co-extrusion, pan coating, air-suspension coating, centrifugal extrusion or any other suitable method. Chemical methods include coacervation phase separation, solvent evaporation, solvent extraction, interfacial polymerisation, simple and complex coacervation, in-situ polymerisation, liposome technology, nanoencapsulation, matrix polymerisation or any other suitable method. The microcapsules produced may be mononuclear, polynuclear or matrix type microcapsules. Alternatively, the microcapsules may be mononuclear with multiple shells, or may form clusters of microcapsules. The microcapsules can, for example, be prepared as described in U.S. Pat. No. 5,137,646, which is incorporated herein by reference with regard to the process of manufacturing microcapsules. Known commercial microencapsulation technology can be used to form the microcapsules, including those commercially marketed by, for example, the Reed Pacific Company in Australia or the Euracli Company in France.

Methods of applying the microencapsulated scented material 20 to the substrate include integrally forming the seemed material 20 with the microcapsules, substrate impregnation or surface coating deposition. In embodiments, the microcapsules are printed on the substrate using printing techniques such as letterpress, dry-offset, flexographic printing, inkjet printing and screen printing.

In certain embodiments, the substrate comprising the microencapsulated scented material 20 is coated with a coating 22 to inhibit premature rupture of the microcapsules during packaging, storage and manual handling. In embodiments, the coating 22 comprises a polymeric material such as polyurethane, polyethylene, polypropylene, polyamide, polyester or a wax. In alternative embodiments where the coating 22 is the shell of the microcapsules, the coating comprises either one or both of the existing shell layer(s) and at least one additional layer. The at least one additional layer comprises, for example, at least one of the previously described shell materials or previously described polymeric coating materials.

The coating 22 may be applied as a single layer or as multiple layers as a multi-layer film. The coating may be applied by any suitable means, such as extrusion coating, dispersion coaling, dip coating, spray coating and resin impregnation. A multi-layer film may be produced by any suitable process, such as lamination or co-extrusion. As is known the person skilled in the art, different polymeric materials have different properties. Accordingly, a multi-layer film may advantageously comprise different polymers, such as a moisture-resistant polymer (e.g. polyethylene) and a scent resistant polymer (e.g. nylon, ethylene vinyl alcohol or polyester).

In embodiments where the coating comprises at least one additional layer, the at least one additional layer is at least 0.1 μm in thickness. For example, the at least one additional layer is between to 0.1 and 500 μm in thickness, for example, from about 1 to 50 μm in thickness. In certain embodiments, the at least one additional layer is perforated with openings, for example, slit or star shaped opening. In certain embodiments, the perforations are star shaped which open upon a force being applied to the coating and then close at rest.

A scent is released front the microcapsules by first abrading a portion of the coating 22 to expose at least one microcapsule. Continued abrasion ruptures the at least one microcapsule to release the scent. In alternative embodiments, instead of abrasive forces, other forces/methods may be used including a compressive force, piercing force, pH, temperature (i.e. melting or bursting due to internal pressure) or dissolution when a solvent chemical is added. In embodiments, abrasion of the coating 22 and rupture of the microcapsules only results in the rupture of a portion of the microcapsules. Accordingly, the coating 22 may be abraded further at multiple instances over time to rupture further microcapsules and release further scent.

The scented insert 10 locates within the interior cavity 31 of the carrier 30 (shown in FIGS. 5 to 7). In the illustrated embodiment, the carrier 30 is plate like and generally circular in cross section. In alternative embodiments, the carrier 30 is any other suitable shape that provides an interior cavity suitable for housing the scented insert 10. In further alternative embodiments, the carrier 30 may be an animal training aid, toy or device.

The carrier 30 forms a portion of an animal training aid, toy or device 40 as shown in FIG. 7. The aid, toy or device 40 is generally in the shape of a ball and can be used as a stand-alone toy for ball-type activities with an animal. However, it is contemplated that the aid, toy or device 40 can take any shape desired. The shape of the aid, toy or device 40 may be dictated by the end use of live aid, toy or device and, in cases where the aid, toy or device 40 is specifically used as an aid for attachment to a wrist band for example, the aid 40 may be in the form of a small, circular, low-profile container.

The animal training aid, toy or device 40 comprises a plurality of housing parts 42, 44 that are separable from one another to allow the scented insert 10 to be introduced or removed from the interior cavity 31 of the carrier 30. In the embodiment shown in FIG. 7, the animal training aid, toy or device 40 comprises two substantially hemispherical housing parts 42 and 44. The aid, toy or device 40 also comprises an activator 46 (shown in FIG. 7) tor activating the scented insert 10 from the unactivated state to the activated state, the activator 46 being operable from an external surface of the housing 42, 44. The interior cavity 31 of the carrier 30 is enclosed between two internal surfaces on the housing parts 42, 44 when the animal training aid, toy or device 40 is assembled. The carrier 30 is positioned between the two housing parts 42 and 44. At least one vent is open to the interior cavity 31 and the exterior of the aid, toy or device 40 to allow passage of a scent from the scented insert 10 from the interior cavity 31 to the outside of the aid, toy or device 10.

In use, the scented insert 10 can be positioned in the interior cavity 31 and between the two housing parts 42 and 44. The microencapsulated scented material 20 is prevented from release through rupture of the microcapsules by the coating 22 that prevents release of a scent until the seemed insert 10 has been activated by removing at least part of the coating 22. The scented insert 10 is activated by the activator 46 which, in the illustrated embodiment is in the form of one or more ribs 48 (shown in FIG. 7) that protrude from at least one of the housing parts 42, 44. The rib(s) 48 contact at least one surface of the scented insert 10 when the aid, toy or device 40 is assembled and rotation of one of the housing parts 42 relative to the other one 44 results in the rib(s) 48 abrading the surface of the scented insert 10 to remove at least some of the coating 22 thereon to thereby activate the scented insert 10 so that the scent is released therefrom.

Advantageously, the scented insert 10 may be used in the carrier 30 in devices such as a wrist band, lead, toy or similar. These embodiments provide a modular system in which a single housing can be attached and removed from a range of training aids (e.g. wrist band or lead) and/or toys (e.g. bone or toy animal). In embodiments, the aid, toy or device 40 can be attached to a substrate or device such as a larger toy or training aid. Accordingly, a device may be in the general shape of a bone. In this situation, the aid, toy or device 40 illustrated in FIG. 7 can be attached to the ends of a central elongate portion to form a training aid, toy or device in the form of a scented bone.

Microencapsulation of the scented material provides the advantages of preventing or inhibiting degradation of the scented material over time, providing a release of the scented material in response to abrasion and providing release of further scented material in response to additional abrasion. Accordingly, the scented insert can be stored with minimal loss of potency of the scented material. Further, an animal's interest in the aid, toy or device comprising the scented insert can be renewed by abrading a further portion of the scented insert to release further scented material.

Coating the scented insert provides the advantages of protecting the microcapsules from rupture during packing, transport and manual handling of the scented insert. Accordingly, the scented material 20 will not contaminate the hands of a user inserting a new scented insert into the carrier of the aid, toy or device, when the cooling on the scented insert is intact.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the disclosure as set forth and defined by the following claims.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

The invention claimed is:

1. A scented insert for use with an animal training aid, toy or device, the insert comprising a substrate having a microencapsulated scented material thereon and/or therein, the microencapsulated scented material comprising a shell surrounding scented material, the insert further comprising a substantially scent impermeable coating on the substrate, the coating being an additional layer that coats the substrate and microencapsulated scented material, and at least one detent that is operable to orient the insert in a carrier for the scented insert, and wherein the coating substantially prevents release of a scent from the scented material, and wherein in use, the coating is abraded to release scent from the microencapsulated scented material.

2. The scented insert of claim 1, wherein, in use, the insert can be changed from an unactivated state in which the coating substantially prevents release of the scent from the scented material to an activated state in which the coating is not intact and the scent is released from the scented material.

3. The scented insert of claim 1, wherein the coating comprises a polymeric material.

4. The scented insert of claim 3, wherein the substrate comprises a porous material.

5. The scented insert of claim 1, wherein the at least one detent inhibits a rotational movement of the insert when positioned in the carrier.

6. A scented insert for use with an animal training aid, toy or device, the insert comprising a substrate having a microencapsulated scented material thereon and/or therein, the microencapsulated scented material comprising a shell surrounding scented material, the insert further comprising a substantially scent impermeable coating on the substrate, the coating being an additional layer that coats the substrate and microencapsulated scented material, and at least one detent that is operable to orient the insert in a carrier for the scented insert, and wherein the microencapsulated scented material releases substantially no scent that is desirable to an animal when the insert is in an unactivated state and releases a scent that is desirable to the animal from the microencapsulated scented material by abrading the coating when the insert is in an activated state.

7. The scented insert of claim 6, wherein the coating comprises a polymeric material.

8. The scented insert of claim 7, wherein the substrate comprises a porous material.

9. The scented insert of claim 6, wherein the at least one detent inhibits a rotational movement of the insert when positioned in the carrier.

* * * * *